M. W. JONES.
SAFETY HOOK.
APPLICATION FILED JUNE 19, 1915.
1,215,281.
Patented Feb. 6, 1917.
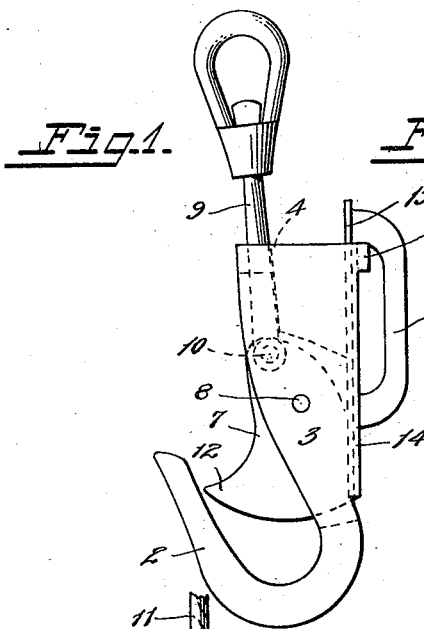
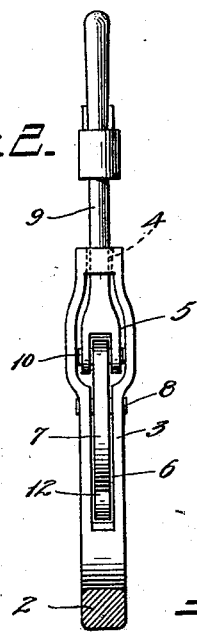
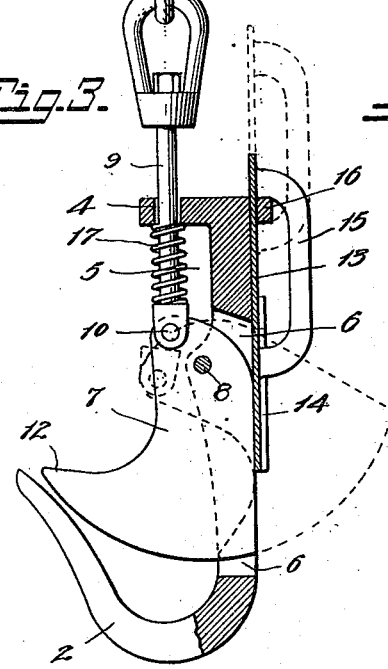
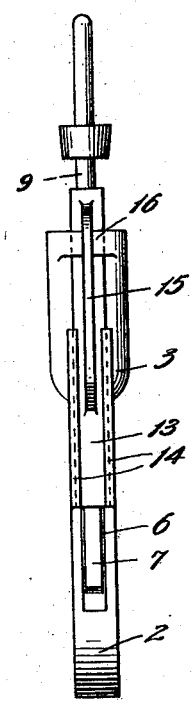
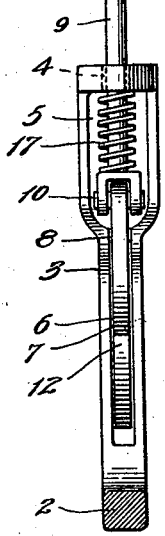
Inventor,
Marcellus W. Jones
By
John S. Barker
His Attorney

UNITED STATES PATENT OFFICE.

MARCELLUS W. JONES, OF CARTHAGE, MISSOURI.

SAFETY-HOOK.

1,215,281.  Specification of Letters Patent.  Patented Feb. 6, 1917.

Application filed June 19, 1915. Serial No. 35,096.

*To all whom it may concern:*

Be it known that I, MARCELLUS W. JONES, a citizen of the United States, residing at Carthage, in the county of Jasper and State of Missouri, have invented certain new and useful Improvements in Safety-Hooks, of which the following is a specification.

My invention relates to safety hooks such as are used in conveying and hoisting apparatus, being particularly devised for use in hoisting mine buckets, though it is not limited in its applications to such use. These buckets with their loads are very heavy, and it is common practice to elevate them by power and very rapidly; and the invention has for its object to render the hooks subject to such use, strong, and reliable under all conditions, and to reduce to a minimum the dangers incident to their employment.

In the accompanying drawings in which two forms of my invention are shown—

Figure 1 is a side elevation of a hook embodying the invention;

Fig. 2 is a front edge view thereof, the end of the hook being broken away;

Fig. 3 is a central vertical section of another embodiment of the invention; and Fig. 4 is a front edge view of the form of hook shown in Fig. 3, the end of the hook being broken away.

Fig. 5 is a rear edge view of the form of hook shown in Fig. 1.

Referring to the drawings, 2 designates the hook proper carried at the lower end of a stem or shank 3, the upper part of which is chambered, as at 5, and the lower part slotted entirely through, as indicated at 6. The chamber 5 is open at the front but closed at the rear and sides and also preferably at the top, the top being perforated, as indicated at 4. A latch piece 7 is mounted within the slot 6 and is united with the stem of the hook by a pivot 8. A suspension piece, represented as being a rod 9, extends through the perforation 4 and is pivotally united, at 10, with the latch 7. The upper end of the rod is provided with a swivel eye or other means for connecting it with the hoisting cable 11. The latch 7 is formed with an extension 12 adapted to lie across the throat of the hook and below the end thereof when the hook is in use, that is, when suspended from the cable 11. The pivotal connection 10 between the rod 9 and the latch 7 is in front of the pivotal connection uniting the latch with the stem of the hook, so that upward draft upon the rod 9 moves the latch forward and holds it with the extension 12 across the throat of the hook as indicated in Fig. 1. In order to open a hook such as represented in Figs. 1 and 2, it is lifted manually relative to the rod 9, which causes the latch to be moved back into the position indicated in dotted lines in Fig. 3. In taking this latter position the latch moves rearward through the slot in which it is located, that is, away from the point of the hook, the extension 12 passing into the slot 6 so that the bail of a bucket or other article to be engaged, may freely pass into and out from the hook.

The latch may be held in proper position closing the hook by the engagement of the rod 9 with the rear wall of the recess or chamber in the stem of the hook in which it lies, such wall forming an abutment arresting the parts in closing position. The hoisting machinery for mine buckets is usually run at a very high speed, and it frequently becomes necessary to stop the hoisting engine very suddenly, as when the bucket strikes an obstruction or arrives at the surface of the earth; with the result that the bail of the bucket is often thrown out of the hook unless provision be made for positively arresting it; and the latch 7 is employed for this purpose. It will be seen that any relative upward movement of the bail, bringing it into engagement with the extension 12 of the latch, tends, by reason of the location of the pivots 8 and 10, to move the latter in a forward direction, that is, into a closing position, rather than in a reverse direction, and hence there is no tendency whatever, to open the hook.

The rod 9 is well housed by the walls of the recess or chamber in which it lies, so that it is practically impossible for an attendant to get his fingers into position to be caught by the bar 9 or any of the moving parts of the hook under the usual conditions of use.

13 indicates a slide constituting a lock for the latch, arranged to hold it in hook-closing position. The slide is mounted in ways 14 formed therefor at the rear of the stem of the hook, and is provided with a handle 15 by which it may be manipulated manually. When the latch is in closing position the locking slide moves by gravity behind the hook and holds the latter until it is raised by hand. It will be understood that the lock may be dispensed with, and an operative hook be still maintained, but under many conditions of use it is a valuable feature. A piece 16 with which the handle of the locking slide engages is arranged to limit its movements and prevent its separation from the hook.

In Figs. 3 and 4 I have shown a form of my invention that is similar in most respects to the form that has already been described and which is illustrated in Figs. 1 and 2, but differs therefrom in that a spring 17 is employed for acting upon the latch and tending to automatically open it. The spring is preferably coiled about the rod 9.

In an arrangement such as this whenever the lock is slid upwardly, and the load taken from off the hook, the latch is automatically moved into position to open the throat of the hook. Draft upon the hoisting cable 11, if opposed by any considerable weight, such as an empty mine bucket supported by the hook, or even by the hook alone, overcomes the force of the spring, compressing it and moving the latch into locking position. In the form of invention represented in Figs. 1 and 2 the hook has to be opened by manual manipulation, as has been stated, and the handle 15 connected with the lock for the latch may be used for this purpose, it being understood that the slide will first be moved to unlock the latch and until it is positively arrested by the pin 16 or some equivalent stop, after which manual power will be transmitted directly to the hook.

The hook described and illustrated, in both of its forms, is of simple construction, and not liable to have any of its parts get out of order; the bail or other object engaging therewith is securely locked in place under all conditions of use; and the moving parts are so arranged and supported that the danger to an operative in using the hook is reduced to a minimum.

What I claim is:—

1. A safety hoisting hook having a stem the upper portion of which is chambered and the lower part slotted, a latch pivoted in the slotted portion of the stem and movable, from the rear, across the throat of the hook to close it and to a position below the point of the hook, and a hoisting element pivotally connected with the latch in front of the pivot that unites it with the stem of the hook and extending therefrom through the chambered part of the stem, whereby weight suspended from the hook tends to cause the latch to close the hook.

2. A safety hoisting hook having a stem the upper portion of which is chambered and the lower part slotted, a latch pivoted in the slotted portion of the stem and movable, from the rear, across the throat of the hook to close it, a hoisting element pivotally connected with the latch in front of the pivot that unites it with the stem of the hook and extending therefrom through the chambered part of the stem, whereby weight suspended from the hook tends to cause the latch to close the hook, and a spring located in the chamber of the hook arranged to open the latch when weight is removed from the hook.

3. A safety hoisting hook having a stem that is slotted opposite the throat of the hook, a latch pivoted in the slotted portion of the stem and movable, from the rear, across the throat of the hook to close it, a locking slide arranged to bear against the rear of the latch to hold it in closing position, and guide ways in which the slide moves secured to the rear side of the stem of the hook and arranged to direct the slide across the slotted portion of the stem.

4. A safety hoisting hook having a stem portion slotted opposite the throat of the hook, a latch pivoted in the slotted portion of the stem and movable, from the rear, across the throat of the hook to close it, a hoisting element pivotally connected with the latch at a point in front of its pivotal connection with the stem of the hook whereby draft upon such element tends to move the latch into closing position, a locking slide adapted to act on the rear face of the latch and hold it in closing position, guide ways at the rear of the stem of the hook in which the locking slide moves, a handle by which the slide is manipulated, and a stop for limiting the upward movement of the slide.

MARCELLUS W. JONES.

Witnesses:
LAURA HOBBS,
H. L. SHANNON.